(12) United States Patent
Smith et al.

(10) Patent No.: US 11,988,151 B1
(45) Date of Patent: May 21, 2024

(54) EMBEDDED ELECTRIC MACHINE OF GAS TURBINE ENGINE

(71) Applicant: Rolls-Royce North American Technologies, Inc., Indianapolis, IN (US)

(72) Inventors: Alan W. Smith, Indianapolis, IN (US); Sara Karaffa, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 0 days.

(21) Appl. No.: 18/179,651

(22) Filed: Mar. 7, 2023

(51) Int. Cl.
| | |
|---|---|
| *F02C 7/32* | (2006.01) |
| *F01D 15/10* | (2006.01) |
| *F02C 7/268* | (2006.01) |
| *H02K 1/18* | (2006.01) |
| *H02K 7/18* | (2006.01) |

(52) U.S. Cl.
CPC .......... *F02C 7/32* (2013.01); *F01D 15/10* (2013.01); *F02C 7/268* (2013.01); *H02K 1/185* (2013.01); *H02K 7/1823* (2013.01); *F05D 2220/323* (2013.01); *F05D 2220/76* (2013.01); *F05D 2230/60* (2013.01); *F05D 2260/85* (2013.01)

(58) Field of Classification Search
CPC . F02C 7/32; F02C 7/268; F01D 15/10; H02K 1/185; H02K 7/1823
See application file for complete search history.

(56) References Cited

U.S. PATENT DOCUMENTS

| | | | |
|---|---|---|---|
| 4,051,399 A * | 9/1977 | Stanwick | H02K 9/10 |
| | | | 310/216.124 |
| 7,202,587 B2 * | 4/2007 | Sargeant | H02K 15/028 |
| | | | 310/418 |
| 8,829,744 B2 | 9/2014 | Pal | |
| 9,356,492 B2 | 5/2016 | Chamberlin et al. | |

(Continued)

FOREIGN PATENT DOCUMENTS

| | | |
|---|---|---|
| EP | 3763931 A1 | 1/2021 |
| WO | 2012073207 A2 | 6/2012 |

OTHER PUBLICATIONS

Zhang et al., "Optimization of cooling structures in gas turbines: A review", Chinese Journal of Aeronautics, vol. 35, No. 6, Chinese Society of Aeronautics and Astronautics & Beihang University, Oct. 21, 2021, pp. 18-46.

*Primary Examiner* — Craig Kim
*Assistant Examiner* — Rene D Ford
(74) *Attorney, Agent, or Firm* — Shumaker & Sieffert, P.A.

(57) ABSTRACT

Gas turbine engines include an engine frame defining an inner radial surface, a shaft rotatably mounted in the engine frame along a longitudinal axis, and an electric machine that includes a rotor coupled to the shaft and a stator coupled to the engine frame and defining an outer radial surface. In some gas turbine engines, the engine frame includes inlet and outlet fluid passages, each extending to a portion of the inner radial surface. The portion of the inner radial surface of the engine frame is spaced from the outer radial surface of the stator to form an annular fluid passage around the stator of an electric machine. The annular fluid passage is configured to direct a cooling fluid around the stator to remove heat from the stator. Some gas turbine engines include two or more positioning keys configured to fix the stator relative to the engine frame.

19 Claims, 8 Drawing Sheets

(56) References Cited

U.S. PATENT DOCUMENTS

| | | | |
|---|---|---|---|
| 9,790,810 B2 | 10/2017 | Coutandin et al. | |
| 11,067,003 B2 | 7/2021 | Stevenson et al. | |
| 2002/0070629 A1* | 6/2002 | Dawson | H02K 1/12 |
| | | | 310/216.051 |
| 2002/0070631 A1* | 6/2002 | Dawson | H02K 1/185 |
| | | | 29/596 |
| 2002/0079781 A1* | 6/2002 | Walko | H02K 1/185 |
| | | | 310/91 |
| 2008/0100159 A1 | 5/2008 | Dawsey et al. | |
| 2010/0327588 A1* | 12/2010 | Macchia | F01D 15/10 |
| | | | 415/232 |
| 2014/0230216 A1* | 8/2014 | Vitello | H02K 15/0006 |
| | | | 29/762 |
| 2019/0010824 A1 | 1/2019 | Snyder | |
| 2019/0211749 A1* | 7/2019 | Rodrigues | F16D 1/116 |
| 2023/0212979 A1* | 7/2023 | Muldoon | F02C 7/06 |
| | | | 60/787 |

* cited by examiner

EMBEDDED ELECTRIC MACHINE OF GAS TURBINE ENGINE

GOVERNMENT RIGHTS

This invention was made with Government support under Grant Contract Number FA8650-19-D2063 awarded by Air Force Research Laboratory (AFRL). The Government has certain rights in the invention.

TECHNICAL FIELD

The present disclosure generally relates to an embedded electric machine of a gas turbine engine.

BACKGROUND

Gas turbine engines of aircraft provide both propulsive and electric power by generating torque on a rotatable shaft. The rotatable shaft of the gas turbine engine may both drive a rotatable shaft of an electric machine during electric power generation and be driven by the rotatable shaft of the electric machine during engine start-up. The rotatable shaft of the electric machine may be positioned away from hot combustion gases and coupled to the rotatable shaft of the gas turbine engine through various connection components, such as offtake shafts, drive shafts, and bevel gears. Such connection components may be heavy, complex, and inefficient. Further, due to high speeds of the rotatable shaft and heat generated during power generation, components such as stator and rotor windings, gear meshes, and bearings require lubrication and cooling using a cooling medium. For example, the electric machine may include a cooling jacket or other sealed cooling system to flow the cooling medium near one or more surfaces of the electric machine.

SUMMARY

The disclosure describes example assemblies, systems, and techniques for cooling, positioning, and/or securing components of an electric machine embedded in a gas turbine engine. A gas turbine engine includes components for generating mechanical power from combustion, one or more structures that house these components, and a main shaft that transfers mechanical power among these components. The gas turbine engine also includes an electric machine for converting electrical power to and/or from mechanical power, which includes a stator and a rotor. The stator is typically a stack of laminations of glued or welded together, also referred to as the lamination stack, in which the laminations are made of cobalt-iron or silicon steel. Rather than locate the electric machine away from the main shaft via one or more offtake shafts, the stator is housed within an engine frame, along with the other power generating components, and the rotor is directly coupled to the main shaft. Such an embedded electric machine may reduce an overall weight and complexity of the gas turbine engine.

During operation of the electric machine, windings of the stator generate a large amount of heat. In some examples, gas turbine engines described herein are configured to cool the stator by creating an annular fluid passage around the stator using surfaces of the stator and the engine frame. The engine frame functions as both a housing for the stator and a structural internal part of the engine. An interior surface of the engine frame is offset from an exterior surface of the stator to form the annular fluid passage, and the engine frame includes inlet and outlet fluid passages to define a fluid path through the engine frame and around the stator. A cooling fluid, such as cooling oil, may remove heat from the stator and transfer at least a portion of the removed heat away from the engine frame to a fluid circulation system. An exterior surface of the engine frame may be exposed to a gas flow path that further removes heat from the cooling fluid during or after flow of the cooling fluid through the annular fluid passage. The flowing cooling fluid directly cools the stator of the electric machine without air gaps or metal casings with additional surfaces to impede the heat flow, thereby more effectively cooling the stator. In this way, gas turbine engines described herein may maintain a lower weight while still providing adequate cooling of the stator.

During installation of the electric machine, the stator may be positioned within and secured to the engine frame to resist relative movement between the stator and the engine frame, such as due to torque generated between the rotor and stator or vibrations generated from moving components. However, structures such as bolts and fasteners that secure the stator to the engine frame of the gas turbine engine may require piecemeal installation of the stator and/or may require an abutting relationship between the stator and the engine frame. In some examples, gas turbine engines described herein may secure the stator to the engine frame by incorporating torque-resisting positioning keys between the stator and the engine frame. Two or more positioning keys are positioned within the stator and the engine frame to tangentially position the stator around an axis of the engine frame and fix the stator to the engine frame. The engine frame and stator may each include slots that receive the positioning keys during installation of the electric machine within the engine frame. In gas turbine engines that include an annular fluid passage such as described above, the positioning keys may also radially position the stator relative to the engine frame at a predetermined spacing to create the annular fluid passage and electrically ground the stator to the engine frame. In this way, gas turbine engines described herein may maintain a lower weight while providing a simple and secure installation of the stator that may accommodate the annular fluid passage around the stator.

In some examples, the disclosure describes a gas turbine engine that includes an engine frame defining an inner radial surface, a shaft rotatably mounted inside the engine frame along a longitudinal axis, and an electric machine. The engine frame includes an inlet fluid passage and an outlet fluid passage, each extending to a portion of the inner radial surface. The electric machine includes a rotor coupled to the shaft and a stator coupled to the engine frame and defining an outer radial surface. The portion of the inner radial surface of the engine frame is spaced from the outer radial surface of the stator to form an annular fluid passage around the stator. The inlet fluid passage, the outlet fluid passage, and the annular fluid passage are interconnected to form a continuous fluid passage. The annular fluid passage is configured to direct a cooling fluid around the stator to remove heat from the stator.

In some examples, the disclosure describes a method of assembling an electric machine of a gas turbine engine. The method includes coupling a stator of the electric machine to an engine frame of the gas turbine engine. The engine frame includes an inlet fluid passage and an outlet fluid passage, each extending to a portion of an inner radial surface of the engine frame. The portion of the inner radial surface of the engine frame is spaced from an outer radial surface of the stator to form an annular fluid passage around the stator, and the inlet fluid passage, the outlet fluid passage, and the annular fluid passage are interconnected to form a continuous fluid passage. The annular fluid passage is configured to direct a cooling fluid around the stator to remove heat from the stator. The method further includes rotatably mounting a shaft in the engine frame along a longitudinal axis. The electric machine includes a rotor coupled to the shaft.

In some examples, the disclosure describes a method for cooling an electric machine of a gas turbine engine. The method includes delivering a cooling fluid to an annular fluid passage around a stator of the electric machine to remove heat from the stator. The gas turbine engine includes an engine frame defining an inner radial surface, a shaft rotatably mounted inside the engine frame along a longitudinal axis, and the electric machine. The engine frame includes an inlet fluid passage and an outlet fluid passage, each extending to a portion of the inner radial surface. The electric machine includes a rotor coupled to the shaft and the stator coupled to the engine frame and defining an outer radial surface. The portion of the inner radial surface of the engine frame is spaced from the outer radial surface of the stator to form the annular fluid passage around the stator, and the inlet fluid passage, the outlet fluid passage, and the annular fluid passage are interconnected to form a continuous fluid passage.

In some examples, the disclosure describes a gas turbine engine that includes an engine frame defining an inner radial surface, a shaft rotatably mounted inside the engine frame along a longitudinal axis, an electric machine, and two or more positioning keys. The electric machine includes a rotor coupled to the shaft and a stator coupled to the engine frame. The two or more positioning keys are configured to substantially fix the stator relative to the engine frame.

In some examples, the disclosure describes a method of assembling an electric machine of a gas turbine engine. The method includes positioning two or more positioning keys in a stator of the electric machine. The method further includes positioning the stator and the two or more positioning keys in an engine frame of the gas turbine engine. Once positioned, the two or more positioning keys substantially fix the stator relative to the engine frame. The method further includes rotatably mounting a shaft in the engine frame along a longitudinal axis. The electric machine includes a rotor coupled to the shaft.

The details of one or more examples are set forth in the accompanying drawings and the description below. Other features, objects, and advantages will be apparent from the description and drawings, and from the claims.

DETAILED DESCRIPTION

Figure 1A:
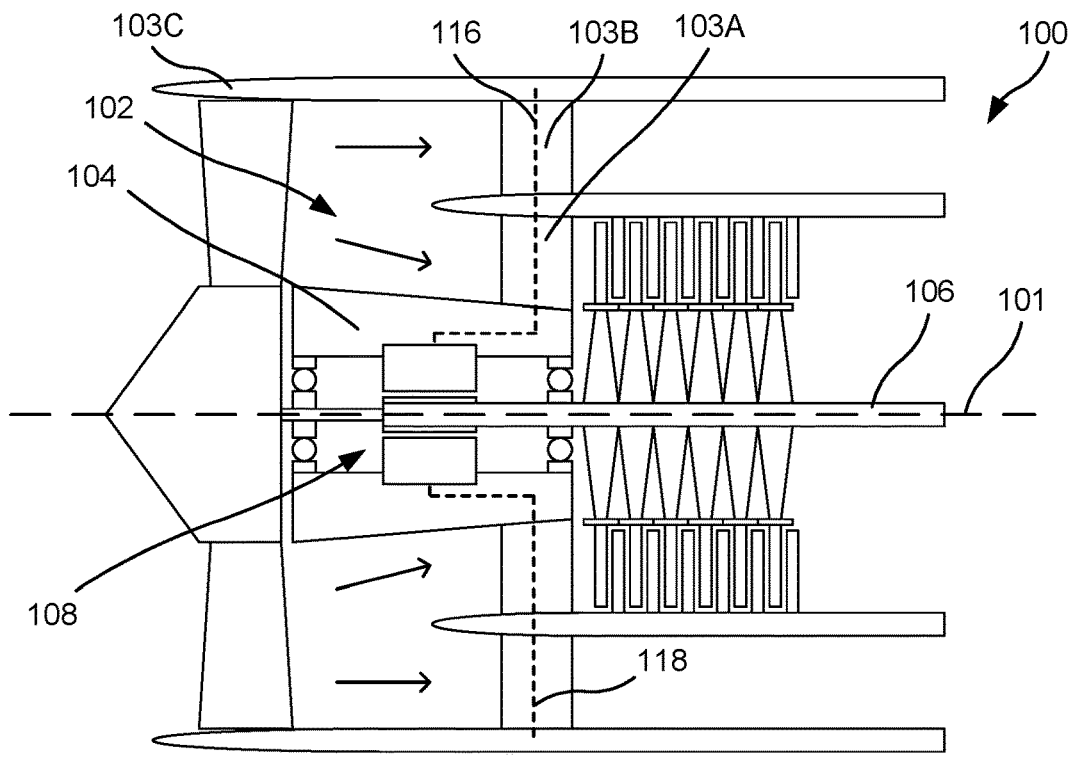
FIG. 1A is a cross-section side view diagram illustrating an example gas turbine engine that includes an embedded electric machine.

The disclosure describes example assemblies, systems, and techniques for cooling, positioning, and/or securing an electric machine embedded within a gas turbine engine. FIG. 1A is a cross-section side view diagram illustrating an example gas turbine engine 100 that includes an embedded electric machine 108. Gas turbine engine 100 includes an exterior casing 103C, an internal engine 102 coupled to casing 103C through an inner vane 103A and an outer vane 103B, and a shaft 106 rotatably mounted in internal engine 102 along a longitudinal axis 101. In the example of FIG. 1A, gas turbine engine 100 illustrates a turbofan gas turbine engine having one or more gas flow paths between exterior casing 103C and interior internal engine 102; however, in other examples, gas turbine engine 100 may include other types of gas turbine engines used for aircraft or other vehicles, such as turbojets.

Internal engine 102 is configured to house various components, such as one or more engine frames 104 or housings, a compressor rotor (not labeled), a combustor (not shown), and a turbine rotor (not shown) coupled to the compressor rotor via shaft 106. A physical configuration of a fan section, a compressor section, and a turbine section (not shown) are driven by working fluid requirements of a thermodynamic cycle of gas turbine engine 100. Each of the compressor rotor and the turbine rotor include axially-spaced discs mounted to shaft 106 and separated by interstage spacers also mounted to shaft 106. Each disc supports a circumferential array of blades. Adjacent to the respective compressor and turbine rotors, internal engine 102 supports vane assemblies that are axially interspaced with the circumferential arrays of blades. Each vane assembly includes a circumferential array of vanes that extend inward from engine frames 104 inside the internal engine 102. Vane dimensions may be optimized for aerodynamic performance (low flow resistance) and maximal variability of flow area as the vanes are rotated.

In addition to housing the gas flow path components described above, internal engine 102 is configured to house electric machine 108. In the example of FIG. 1A, electric machine 108 is positioned forward of a compressor section due to a relatively lower temperature upstream of the compressor section and/or ease of accessibility of electric machine 108; however, in other examples, electric machine 108 may be positioned in portions of the engine frame 104 corresponding to other sections of gas turbine engine 100, such as the turbine section, a combustion section, a fan section, or a propulsion section. Electric machine 108 may be configured to convert mechanical power to and/or from electrical power. Electric machine 108 may include any of a variety of systems including, but not limited to, generators, starters, combined starters/generators, motors, or the like. Electric machine 108 may be used in a variety of applications including, but not limited to, electrical power generation, propulsion, and the like.

In some examples, electric machine 108 may be used in aircraft or watercraft applications in which space, weight, and longevity of components may be important for safety and/or efficiency, and in which opportunities for performing maintenance may be limited during operation. Rather than locate electric machine 108 away from shaft 106 via one or more offtake shafts, electric machine 108 is housed within engine frame 104, along with the other power generating components, and directly coupled to the main shaft. Such an embedded electric machine 108 may reduce an overall weight and complexity of gas turbine engine 100 compared to gas turbine engines in which an electric machine is away from longitudinal axis 101. However, due to the embedded position of electric machine 108 within internal engine 102, electric machine 108 may be relatively difficult to access, either physically (e.g., during maintenance or installation) or fluidically (e.g., for cooling during operation).

Figure 1B:
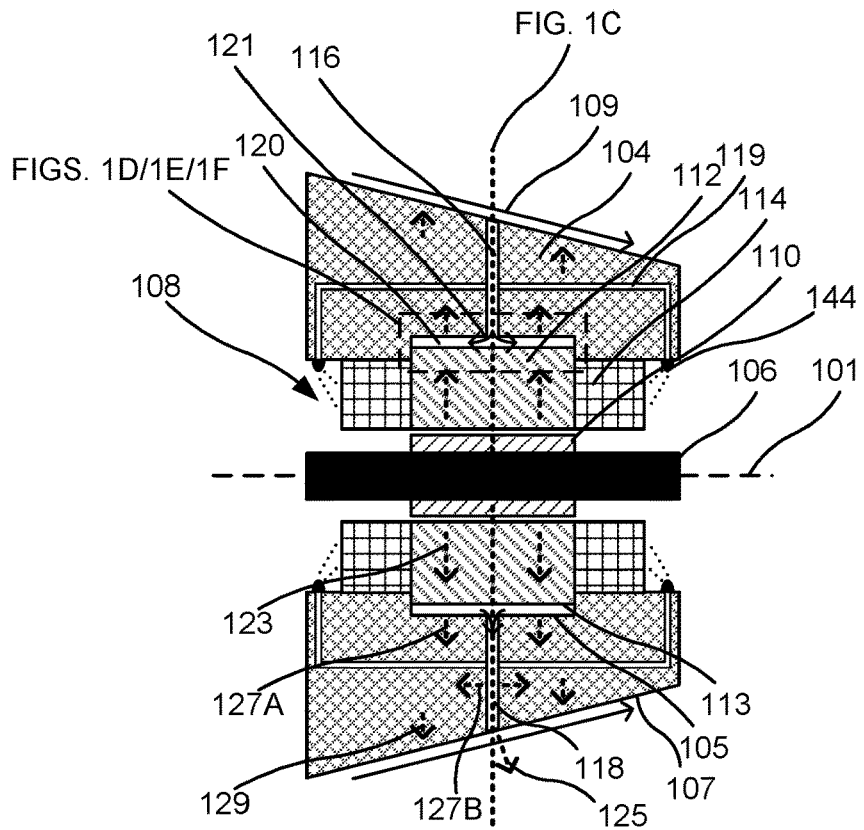
FIG. 1B is a cross-section side view diagram illustrating an example portion of a gas turbine engine.
Figure 1C:
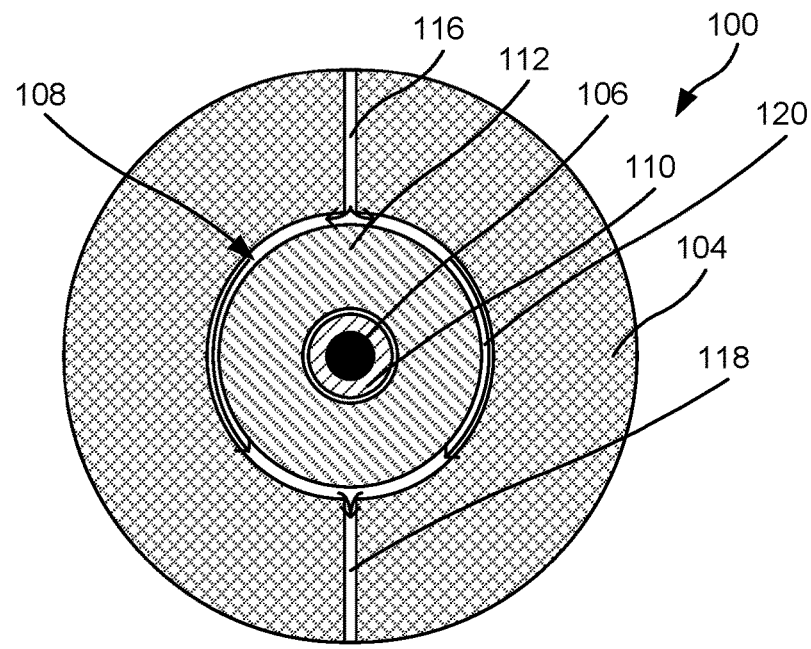
FIG. 1C is a cross-section front view diagram illustrating an example portion of a gas turbine engine.

FIGS. 1B and 1C are cross-section side view and front view diagrams, respectively, illustrating an example portion of gas turbine engine 100 of FIG. 1A that includes electric machine 108. Electric machine 108 includes a rotor 110 coupled to shaft 106 and a stator 112 coupled to engine frame 104 located inside internal engine 102. Stator 112 includes a stator core and stator windings, of which a portion extend beyond the core as end windings 114. During operation, rotor 110 rotates inside stator 112 in response to a mechanical force from shaft 106 to induce an electrical voltage in stator 112. Due to electric current flow in the stator windings, stator 112 may produce a relatively large amount of heat, especially for high rotational speeds of shaft 106. Typically, a stator of an electric machine positioned away from an axis of a gas turbine engine may include a cooling jacket or cooling frame that provides fluid passages around the stator for a cooling medium to flow through the jacket or frame. However, such a jacket or frame may add weight to the gas turbine engine and, in the instance of an embedded electric machine, may occupy a large volume in a volume-constrained space.

Rather than cool stator 112 using a cooling jacket or frame, gas turbine engine 100 may be configured to create fluid passages around stator 112 by positioning stator 112 relative to engine frame 104 at a predetermined spacing, such that existing structures and surfaces of engine frame 104 and stator 112 may form boundaries of the fluid passages. Engine frame 104 defines a gas flow path 109 forming an outer boundary of engine frame 104 in a radial direction from axis 101 and an inner radial surface 105 forming an inner boundary of engine frame 104 in a radial direction from axis 101. Stator 112 defines an outer radial surface 113 forming an outer boundary of stator 112 in a radial direction from axis 101 that faces engine frame 104. A portion of inner radial surface 105 of engine frame 104 is spaced from outer radial surface 113 of stator 112, such that inner radial surface 105 and outer radial surface 113 form outer and inner boundaries, respectively, of an annular fluid passage 120 around stator 112.

To fluidically couple annular fluid passage 120 to a fluid circulation system, engine frame 104 includes an inlet fluid passage 116 and an outlet fluid passage 118. Inlet fluid passage 116 extends from a fluid passage inside a stator vane or strut, in the gas flow path attached to the engine frame 104 to an inlet opening in inner radial surface 105. Outlet fluid passage 118 extends from an outlet opening in inner radial surface 105 to a stator vane or strut in the gas flow path outlet opening in outer radial surface 107. While illustrated as single passages in a straight, radially extending configuration within a monolithic engine frame structure, inlet and outlet fluid passages 116, 118 may have any number, form, or configuration of fluid passages, such as multiple inlets/outlets, multiple parallel passages, curved configurations, and/or configurations that includes pipes or other structures. Straight fluid passages formed within a monolithic engine frame structure may be relatively easy to fabricate using subtractive machining techniques, such as boring.

A number of inlet fluid passages 116 and outlet fluid passages 118 to and from annular fluid passage 120, and a location of these fluid passages 116, 118, may be increased to promote improved cooling. A number and position of inlet fluid passage 116 and outlet fluid passage 118 may define a flow profile, including direction of flow path and amount of flow, of annular fluid passage 120. In the example of FIG. 1C, a single inlet fluid passage 116 and a single outlet fluid passage 118 are positioned on opposite sides of engine frame 104, such that a fluid flow path around stator 112 is relatively even across axis 101.

Each of inlet fluid passage 116 and outlet fluid passage 118 is configured to couple to a fluid circulation system. For example, while not shown, inlet fluid passage 116 and outlet fluid passage 118 may include one or more connectors configured to couple to piping or other conduits of a fluid circulation system. Inlet fluid passage 116 is configured to receive a pressurized cooling fluid from the fluid circulation system, and outlet fluid passage 118 is configured to discharge the cooling fluid to the fluid circulation system. Inlet fluid passage 116, outlet fluid passage 118, and the annular fluid passage are interconnected to form a continuous fluid passage.

Annular fluid passage 120 is configured to direct a pressurized cooling fluid 121 around stator 112 to remove thermal energy ("heat") from stator 112. Cooling fluid 121 may be received by inlet fluid passage 116 at an inlet temperature and flow into annular fluid passage 120. Heat flow 123 from stator 112, such as heat generated in the stator windings, may be absorbed by cooling fluid 121 in annular fluid passage 120 as heat flow 125. Heated cooling fluid 121 may flow from annular fluid passage 120 into outlet fluid passage 118 and discharge from outlet fluid passage 118 at an outlet temperature that is higher than the inlet temperature. Heat removed by cooling fluid 121 may be removed by a fluid cooling system of the fluid circulation system. As a result, stator 112 may operate within a desired temperature range without, or with a smaller contribution from, additional cooling structures, such as cooling jackets.

In some examples, engine frame 104 may function as a heat sink for removing at least a portion of the heat absorbed by cooling fluid 121. At least a portion of outer radial surface 107 of engine frame 104 may be configured to be a surface of the engine gas flow path 109. Gas flow path air 109 is a gas stream having a relatively low temperature compared to the pressurized cooling fluid and generator. A portion of heat 123 absorbed by cooling fluid 121 may transfer from cooling fluid 121 in annular fluid passage 120 into engine frame 104 as heat 127A and/or transfer from cooling fluid 121 in outlet fluid passage 118 into engine frame 104 as heat 127B. Heat 127A and/or heat 127B may transfer from engine frame 104 to gas flow path air 109. In this way, an amount of thermal energy to be removed from cooling fluid 121 by the fluid cooling system of the fluid circulation system may be reduced.

In some examples, inlet fluid passage 116 and/or outlet fluid passage 118 may be configured to increase an amount of cooling fluid 121 while cooling fluid 121 is flowing through engine frame 104 and/or vanes 103A and/or 103B. The routing of cooling fluid 121 in passages 116 and 118 may be designed to provide additional passage lengths and/or additional surface area to promote the heat transfer from the coolant to the engine frame 104. For example, as shown in FIG. 1A, passages 116 and 118 may extend axially through a portion of engine frame 104, radially through a portion of vanes 103A and 103B, and into casing 103C. The fluid passages in the vanes or struts 103A, 103B can conduct heat from cooling fluid 121 to exterior surfaces of the vane or strut 103A, 103B, which may be very well cooled by the impingement of rapidly flowing gas flow path air. In this way, cooling fluid 121 can be cooled both in inlet fluid passage 116 to electric machine 108 and outlet fluid passage 118 from electric machine 108.

By using gas flow paths within gas turbine engine 100 to remove heat from cooling fluid 121, gas turbine engine 100 may reduce an amount of cooling provided by other systems, such as a fluid circulation system. The gas flow paths may function as effective heat sinks that can transfer large amounts of heat, especially on cold days, from the vanes or struts 103A, 103B in the gas flow path or engine frame 104 along the inner gas flow path. Advantages of transferring heat directly to the gas flow path include a reduction of heat to a fluid cooling system of the fluid circulation system, which may result in smaller heat exchangers ("HXs") to cool the coolant fluid and, correspondingly, less drag to gas turbine engine 100 due to smaller HXs at the engine exterior or in the gas flow path and less weight. Other advantages may include heat entering the gas flow path providing more energy to the gas flow path air, which may provide a small increase in engine power as the lost heat can be recaptured to provide a small amount of useful work in gas turbine engine 100. Another advantage may be that heat in the gas flow path and engine frame 104 and/or casing 103C can also be used to melt ice that accumulates on the frame gas flow path surfaces and the stator vanes attached to the vanes.

Fluid 121 may function as a lubricant and/or coolant, and may include any lubricant or coolant that is configured to flow through annular fluid passage 120 during operation of electric machine 108. A variety of cooling fluids may be used including, but not limited to, refrigerants, cooling oil, cooling water, or the like. In some examples, fluid 121 may be configured to function primarily as a liquid coolant and selected for various thermal properties, such as high heat capacity, high thermal conductivity, high boiling point, low freezing point, dielectric properties, and the like.

In some examples, the cooling fluid includes a cooling oil. In addition to removing heat from stator 112, the cooling oil may be configured to lubricate and/or provide spray cooling to one or more components within electric machine 108. Various components of electric machine 108 may have various cooling requirements, and may be at different positions within the engine frame 104 relative to annular fluid passage 120. For example, end windings 114 may be positioned relatively far from annular fluid passage 120.

To provide additional cooling to end windings 114 or other components that are not immediately adjacent to annular fluid passage 120, gas turbine engine 100 may include one or more spray jets 144 configured to spray at least a portion of the cooling fluid on end windings 114. Such cooling fluid may be configured to contact end windings 114 without impairing operation of electric machine 108. For ease of description, fluid 121 will be described herein as a "fluid," and may include oils; however, lubricants or coolants that are not oil-based may be used. For example, the lubricant and/or coolant may include aliphatic hydrocarbons. Spray jets 144 may be located to spray the outer diameter of the end windings through passages 119 connected to fluid passages 120, 118 or 116. Cooling fluid sprayed by spray jets 144 may include an engine lubricant, such as oil or fuel. In some examples, spray jets 144 include one or more nozzles configured to spray a cooling fluid on at least a portion of end windings 114. To provide lubrication and cooling to components of electric machine 108 that are not in proximity to annular fluid passage 120, gas turbine engine 100 may include spray jets 144 configured to produce a stream of cooling fluid directed toward a component. For example, a fluid stream may be ejected from a nozzle of a nozzle assembly toward a component and contact the component to lubricate and cool the component. Such cooling fluid stream may be supplied in a manner that both/either adequately lubricates and/or cools the components, while accommodating other components within electric machine 108.

Figure 1D:
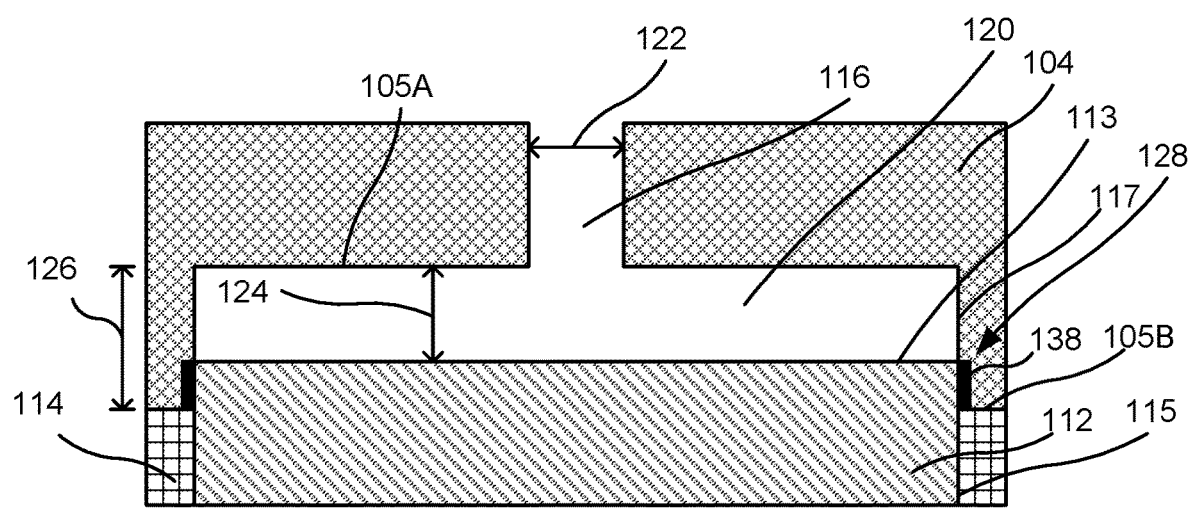
FIG. 1D is an expanded cross-section side view diagram illustrating an example portion of a gas turbine engine.

FIG. 1D is an expanded cross-section side view diagram illustrating an example portion of the gas turbine engine of FIG. 1A, as indicated in FIG. 1C. A portion of inner radial surface 105A of engine frame 104 is spaced from outer radial surface 113 of stator 112 to form an annular fluid passage 120 around stator 112 having a spacing 124. Spacing 124 between a portion of inner radial surface 105A of engine frame 104 and outer radial surface 113 of stator 112 may be selected to permit adequate volume of cooling fluid 121 in annular fluid passage 120 to absorb heat from stator 112 while maintaining an adequate flow rate of cooling fluid 121 to refresh cooling fluid 121 in annular fluid passage 120. In some examples, spacing 124 may be greater than about 1 millimeter, such as to avoid a risk of passage blockage, such as 2-3 millimeters. Flow passage radial height should be small to increase the coolant oil flow velocity in the annular passage which increases the heat transfer at the ID and OD surfaces.

While shown as being uniform in an axial direction along axis 101 and a tangential direction around axis 101, spacing 124 may vary along or around axis 101. As one example, as cooling fluid 121 travels around stator 112 (e.g., in a tangential direction around axis 101) absorbing heat, cooling fluid may remove a smaller amount of heat from stator 112 due to an increasing temperature of cooling fluid 121, such that spacing 124 of annular fluid passage 120 near inlet fluid passage 116 may be different from spacing 124 of annular fluid passage 120 near outlet fluid passage 118. As another example, as cooling fluid travels along stator 112 (e.g., in an axial direction along axis 101) absorbing heat, cooling fluid 121 may remove a smaller amount of heat from stator 112 due to an increasing temperature of cooling fluid 121 or more stagnant flow of cooling fluid 121, such that spacing 124 of annular fluid passage near inlet fluid passage 116 or outlet fluid passage 118 may be different from spacing 124 of annular fluid passage near a wall of annular slot 128. Inlet fluid passage 116 and outlet fluid passage 118 (not shown) may each have a diameter 122. Diameter 122 may be configured to provide adequate flow rate (e.g., flow volume and/or flow velocity) of cooling fluid 121 into annular fluid passage 120. In some examples, diameter 122 may be less than about 1 centimeter. The spacing 124 of the annular fluid passage may be configured to be non-uniform around the circumference if oil spray passages divert a portion of the oil from the annular passage 120 so the net flow in the annular passage 120 reduces. The spacing 124 of annular fluid passage 120 may also vary if inlet fluid passage 116 and outlet fluid passage 118 cause variation in the oil flow around the circumference of stator 112. The diameters of the passages 116 and 118 may also be different due to the diversion of some of cooling fluid 121 to spray jets 144.

In the example of FIG. 1D, engine frame 104 includes a major inner radial surface 105B that defines a general interior shape of engine frame 104. Engine frame 104 includes an annular slot 128 defining a portion of inner radial surface 105A of engine frame 104 and extending around axis 101 of gas turbine engine 100. Annular slot 128 may have a depth 126 that extends outward in a radial direction from major inner radial surface 105B of engine frame 104. A portion of outer radial surface 113 of stator 112 is configured to position within annular slot 128 of engine frame 104. In the example of FIG. 1D, the portion of outer radial surface 113 or the axial surfaces 115 of stator 112 are configured to position within annular slot 128 of engine frame 104 with a fit that is designed to minimize or control the coolant leakage through surface geometry and finishes or other means, such that engine frame 104 may seal or provide controlled coolant passages against stator 112 for annular fluid passage 120. Annular slot 128 may secure stator 112 within engine frame 104 in an axial direction along axis 101.

In some examples, electric machine 108 includes one or more seals 138 positioned between engine frame 104 and stator 112 to seal annular fluid passage 120. During operation, engine frame 104 and stator 112 may be subject to various thermal transients, such that an interface between engine frame 104 and stator 112 may change. For example, during operation of electric machine 108 after gas turbine engine 100 has reached operating temperature, engine frame 104 and stator 112 may be relatively hot, and may have expanded such that an interface between frame 104 and stator 112 is relatively tight and annular fluid passage 120 is sealed. However, during start-up, an interface between engine frame 104 and stator 112 may not be as tight, such that annular fluid passage 120 may not seal adequately. To provide an additional seal between engine frame 104 and stator 112, seals 138 may be positioned at or near the interface between engine frame 104 and stator 112 to define a pressurized boundary of annular fluid passage 120. For example, seals 138 may substantially prevent or reduce cooling fluid 121 at operating pressures and temperatures from discharging between the interface between engine frame 104 and stator 112. Seals 138 may be configured to withstand an anticipated operating temperature of stator 112. In the example of FIG. 1D, seals 138 are faces configured to interface with outer axial surface 115 of stator 112 and inner axial surface 117 of engine frame 104; however, in other example, seals 138 may be other types of seals and/or interface with other surfaces of engine frame 104 and stator 112.

During operation, engine frame 104 and stator 112 may be subject to various thermal conditions and thermal transients, such that the spacing 124 between engine frame 104 and stator 112 may change. For example, during operation of electric machine after gas turbine engine 100 has reached operating temperature, engine frame 104 and stator 112 may be relatively hot and this could result in different spacing relative to start-up when the frame 104 is cold due to the difference in thermal expansion of the stator 112 and engine frame 104 materials. Also, stator 112 and frame 104 may heat up at different rates since the stator 112 is the source of heat and may have different thermal heat capacity. The spacing 124 (shown in FIG. 1D) may be designed to be considerably larger than the dimensional changes due to the thermal expansion of the stator 112 and frame 104 for the entire operating range. The spacing 124 may be designed such that the cooling flow in the annulus 120 is optimized for the entire range of operating conditions and corresponding thermal expansion.

Gas turbine engine 100 may include various additional structures configured to improve heat removal or fluid retention within annular fluid passage 120. In some examples, inner radial surface 105 of engine frame 104 and/or outer radial surface 113 of stator 112 may have one or more fluid flow structures configured to increase a surface area of annular fluid passage 120 and/or control a direction of flow of cooling fluid 121 through annular fluid passage 120. As one example, an amount of heat absorbed from stator 112 into cooling fluid 121 and an amount of heat transferred from cooling fluid 121 into engine frame 104 may be related to a surface area of a corresponding inner radial surface 105 and outer radial surface 113. As another example, a uniformity of heat transfer into cooling fluid 121 may be related to a uniformity of flow of cooling fluid 121 through annular fluid passage 120. As such, a surface area of inner radial surface 105 and/or outer radial surface 113, and/or uniformity of flow of cooling fluid by inner radial surface 105 and/or outer radial surface 113 may be increased through inclusion of projecting structures or guiding structures along inner radial surface 105 and/or outer radial surface 113.

Figure 1E:
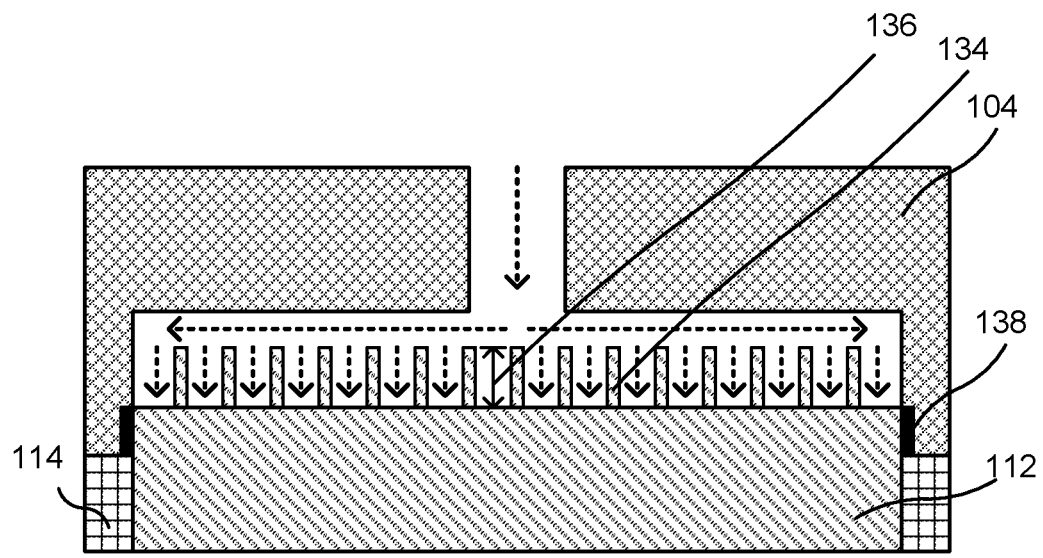
FIG. 1E is an expanded cross-section side view diagram illustrating an example portion of a gas turbine engine.

FIG. 1E illustrates an expanded cross-section side view diagrams illustrating an example portion of the gas turbine engine of FIG. 1A, as indicated in FIG. 1C. In some examples, outer radial surface 113 of stator 112 includes a plurality of inner fins 134.

The inner fins 134 may be configured to form multiple annular flow passages around the stator 112. Inner fins 134 may also be configured to increase a surface area of outer radial surface 113 in contact with cooling fluid 121 and/or increase a uniformity and turbulence of cooling flow of cooling fluid 121. Each inner fin 134 may have a length 136. In some examples, length 136 may be less than about 2 centimeter or a little less than the 124 spacing such that axial flow from one annular flow passage to another is discouraged. Axial flow passages or plenums, for example axial slots in the engine frame or stator may be added to ensure inlet and outlets for each annular flow passage as shown in FIG. 1E or F. Inner fins 134 may have any number, shape, or configuration. In some examples, inner fins 134 may extend continuously around annular fluid passage 120. In some examples the flow passages can be uniform in other examples the flow passages can be of differing widths.

Figure 1F:
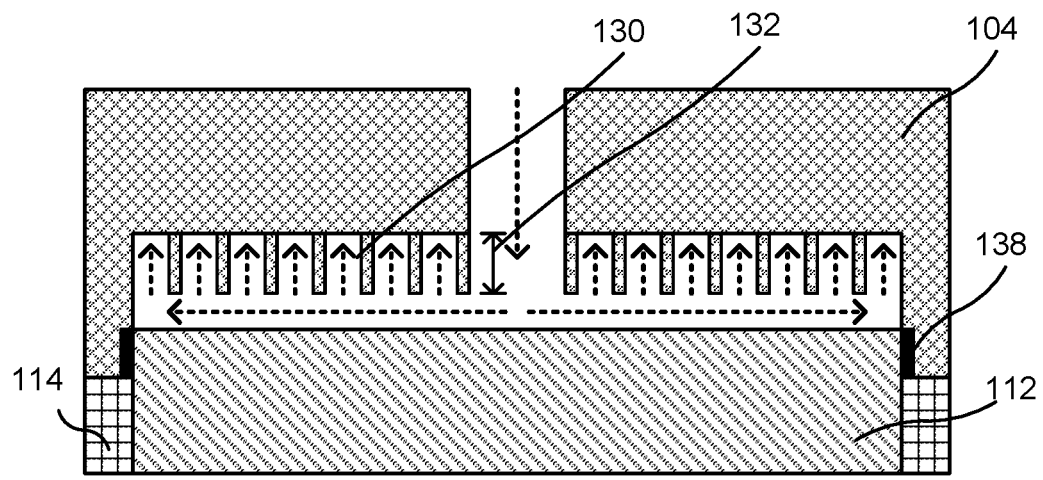
FIG. 1F is an expanded cross-section side view diagram illustrating an example portion of a gas turbine engine.

FIG. 1F illustrates an expanded cross-section side view diagrams illustrating an example portion of the gas turbine engine of FIG. 1A, as indicated in FIG. 1C. In some examples, inner radial surface 105A of engine frame 104 includes a plurality of outer fins 130. Outer fins 130 may be configured to increase a surface area of inner radial surface 105A in contact with cooling fluid 121 and/or increase a uniformity and turbulence of cooling flow of cooling fluid 121. Each outer fin 130 may have a length 132. In some examples, length 132 may be greater than or equal to about 1 millimeter or a half of spacing 124.

Referring to both FIGS. 1E and 1F, outer fins 130 and/or inner fins 134 may have any number, shape, or configuration. In some examples, outer fins 130 and/or inner fins 134 may extend continuously around annular fluid passage 120. These fins may have uniform or non-uniform spacing as required to optimize the flow field and cooling. Other examples for flow of cooling fluid 121 in annular fluid passage 120 may include having cooling fluid 121 travel axially with axial passages in engine frame 104 or stator 112. In some examples, inner radial surface 105A of engine frame 104, outer radial surface 113 of stator 112, outer fins 130 in 105A inner radial surface of engine frame 104, and/or inner fins 134 in outer radial surface 113 of stator 112 may include one or more axial, circumferential, or spiral cooling passages, or combinations thereof, that extend around stator 112 to improve cooling of stator 112. For example, engine frame 104 or stator 112 may include passages in a spiral pattern or zig-zag pattern, such as may be achieved by having passages or slots formed into the engine frame ID 105A or stator OD 113 to direct the coolant in the required pattern around the OD of the stator 112.

Figure 1G:
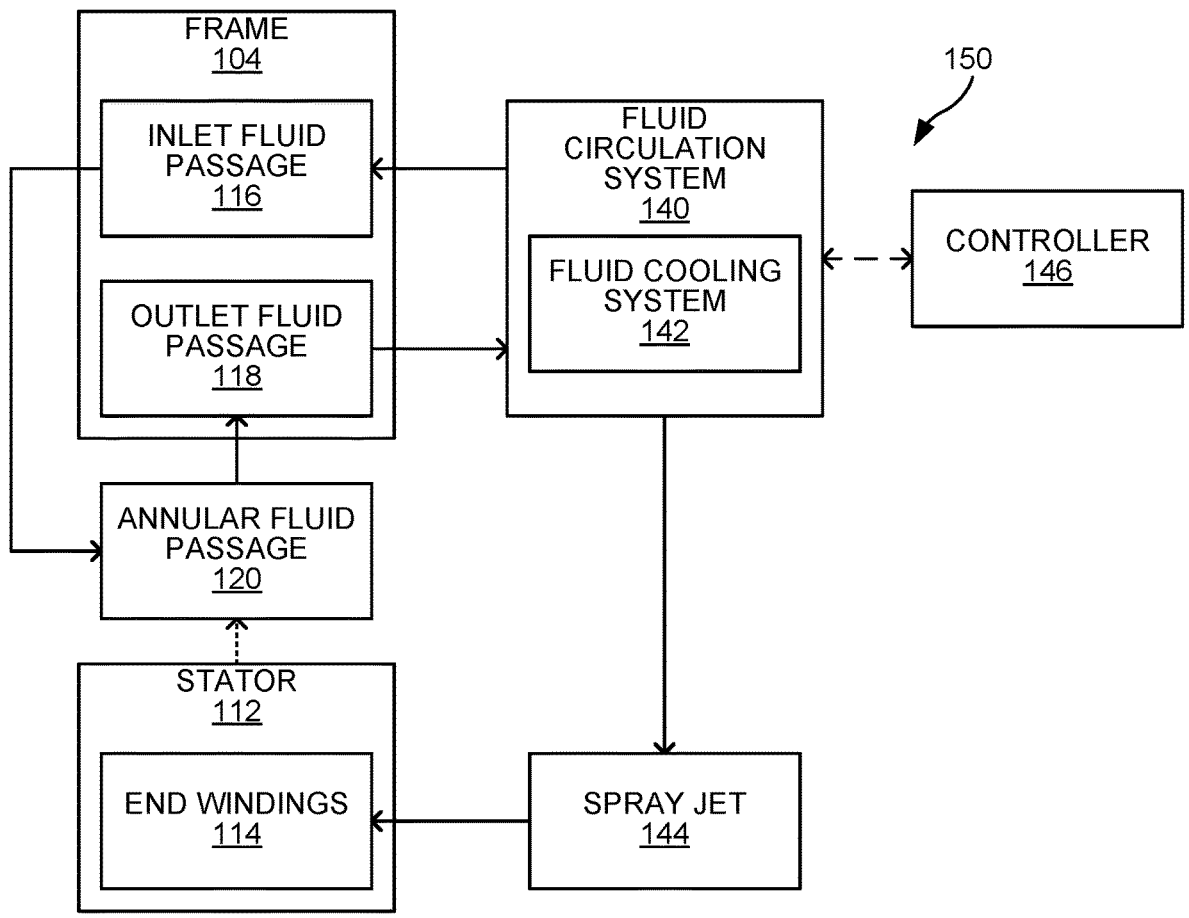
FIG. 1G is a conceptual block diagram illustrating a system for cooling an embedded electric machine of a gas turbine engine.

FIG. 1G is a conceptual block diagram illustrating a system 150 for cooling an embedded electric machine of the gas turbine engine of FIG. 1A. System 150 includes a fluid circulation system 140 and a controller 146 configured to control fluid circulation system 140. Fluid circulation system 140 may be configured to supply cooling fluid 121 to electric machine 108, cool cooling fluid 121 from electric machine 108, such as by fluid cooling system 142, and filter cooling fluid 121 from electric machine 108, and may include components, such as a pump, a heat exchanger, and/or a filter, configured to provide the supply, cooling, and filtration functions. In some examples, the pump may be powered by electric machine 108, such as via a pump gear assembly. Fluid circulation system 140 may be configured to supply cooling fluid 121 to engine frame 104 and/or one or more spray jets 144 for spraying one or more components, such as end windings 114.

Controller 146 may be configured to control fluid circulation system 140. For example, controller 146 may send control signals and receive measurement signals from fluid circulation system 140. The controller may control the speed or torque of an electric motor driving a pumping element. The control signals may control a pressure, temperature, and/or flow rate of cooling fluid 121 supplied by fluid circulation system 140 to engine frame 104 to adequately lubricate and/or cool components of electric machine 108. In some examples, controller 146 may be configured to control fluid circulation system 140 to deliver (e.g., increase, decrease, or maintain) cooling fluid 121 at a pressure within and/or a flow rate of cooling fluid 121 to the various fluid passages, such as inlet fluid passage 116, outlet fluid passage 118, and annular fluid passage 120, based on at least one of a temperature of the one or more components (e.g., stator 112), a rotational speed of one or more components of electric machine 108 (e.g., shaft 106), an overall power level of electric machine 108, or any other indication of an extent to which lubrication and/or cooling may be required or beneficial. Controller 146 includes processing circuitry, including any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processing circuitry herein may be embodied as software, firmware, hardware, or any combination thereof.

Figure 2A:
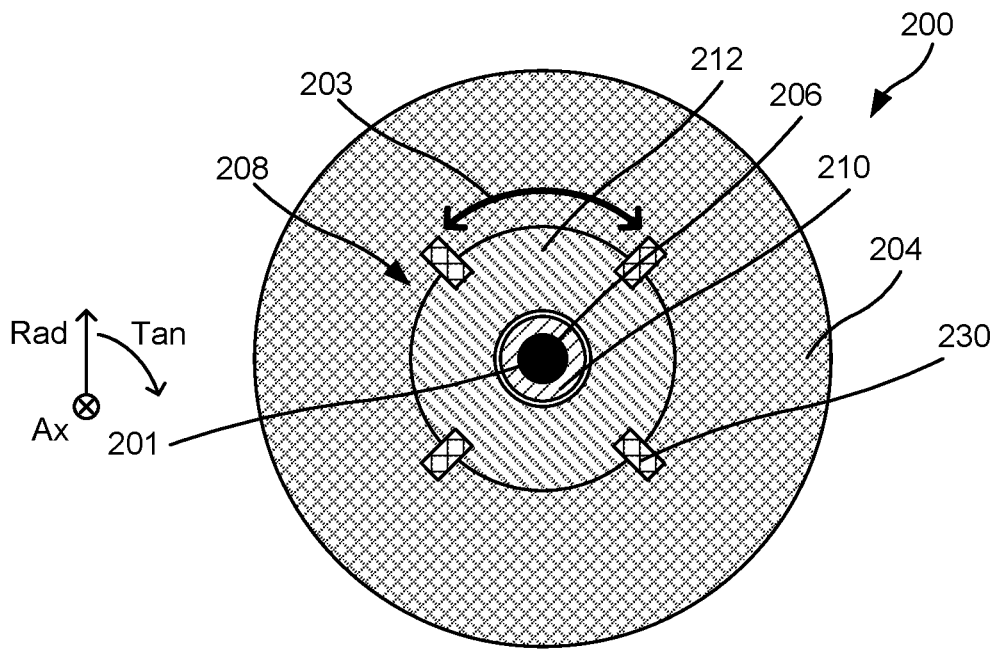
FIG. 2A is a cross-section front view diagram illustrating an example portion of a gas turbine engine.
Figure 2B:
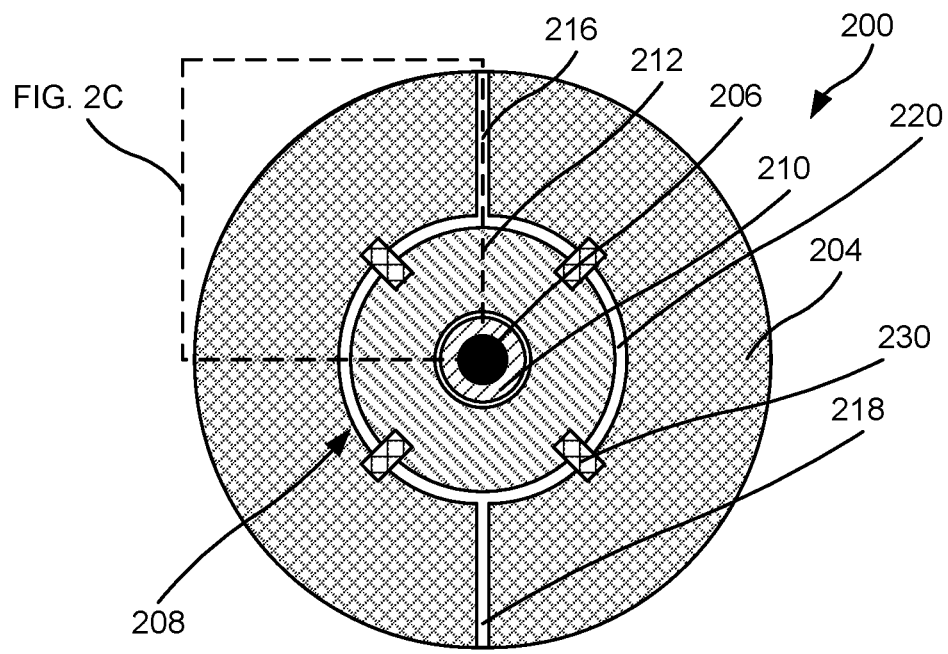
FIG. 2B is a cross-section front view diagram illustrating an example portion of a gas turbine engine.

Embedded electric machines may be relatively difficult to install within a gas turbine engine compared electric machines positioned away from a main shaft of the gas turbine engine. To more easily and/or accurately position an embedded electric machine within a gas turbine engine, a gas turbine engine may include positioning keys that position a stator of the electric machine relative to an engine frame surrounding the electric machine. FIGS. 2A and 2B are cross-section front view diagrams illustrating an example portion of a gas turbine engine 200, such as gas turbine engine 100 of FIG. 1A, that includes an embedded electric machine 208. Gas turbine engine 200 includes an engine frame 204 defining an outer radial surface and an inner radial surface, a shaft 206 rotatably mounted in engine frame 204 along a longitudinal axis 201, and electric machine 208 that includes a rotor 210 coupled to the shaft 206 and a stator 212 coupled to engine frame 204 and defining an outer radial surface. Unless otherwise indicated, gas turbine engine 200, engine frame 204, shaft 206, electric machine 208, rotor 210, and stator 212 may be structurally and/or functionally similar to gas turbine engine 100, engine frame 104, shaft 106, electric machine 108, rotor 110, and stator 112 of FIGS. 1A-1F.

Figure 2C:
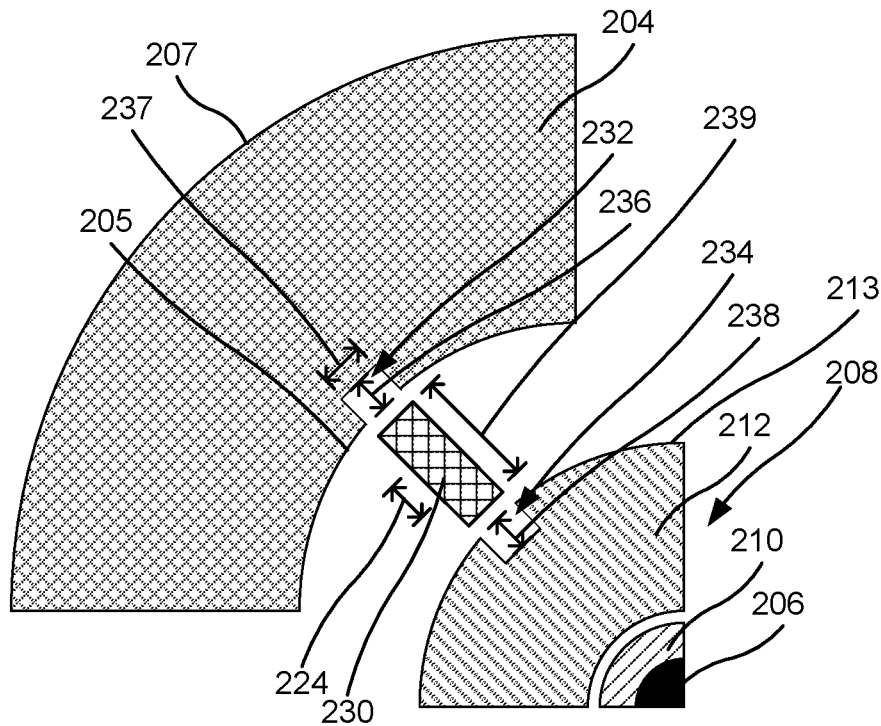
FIG. 2C is an exploded cross-section and expanded side view diagram illustrating an example portion of a gas turbine engine.

Gas turbine engine 200 includes two or more positioning keys 230 configured to interface with stator 212 and engine frame 204 to substantially position and fix stator 212 relative to engine frame 204 around a longitudinal axis 201 of shaft 206. In the examples of FIGS. 2A-2C, a tangential direction or position ("Tan"), a radial direction or position ("Rad"), or axial direction or position ("Ax") represents a direction or position around, perpendicular to, or along longitudinal axis 201, respectively. Positioning keys 230 are configured to locate and position stator 212 in a tangential direction around longitudinal axis 201 of shaft 206. During installation of stator 212, stator 212 may be assembled outside engine frame 204 and slid along longitudinal axis 201 into engine frame 204. To accurately align stator 212 in a tangential direction around the longitudinal axis, stator 212 may be positioned to align slots in stator 212 with slots in engine frame 204. Positioning keys 230 may be configured to be installed in each slot of stator 212 and engine frame 204 such that they may be removed during disassembly. Once positioned, positioning keys 230 are configured to resist a torque 203 or other force created between stator 212 and engine frame 204 in a direction tangential to the longitudinal axis of shaft 206. Such torque may be a result of relative torque between stator 212 and rotor 210, vibrations created by shaft 206 or other moving components of gas turbine engine 200, or the like.

In the example of FIG. 2A, four positioning keys 230 are shown; however, gas turbine engine 200 may include any number of positioning keys 230. A number and position of positioning keys 230 may be selected to evenly distribute a force between stator 212 and engine frame 204. In some examples, gas turbine engine 200 includes two or more positioning keys 230 that are evenly spaced around the longitudinal axis. In FIG. 2A, positioning keys 230 are positioned at about 90-degree intervals around longitudinal axis 201.

In the example of FIG. 2A, the inner radial surface of engine frame 204 and the outer radial surface of stator 212 are adjacent to each other. In other examples, such as the example of FIG. 2B, engine frame 204 and stator 212 may be spaced from each other, such as to incorporate a cooling annulus or accommodate thermal expansion. In such examples, in addition to tangentially positioning stator 212 relative to engine frame 204, positioning keys 230 are configured to radially position stator 212 relative to engine frame 204.

Referring to FIG. 2B, engine frame 204 includes an inlet fluid passage 216 and an outlet fluid passage 218, each extending from the outer radial surface to a portion of the inner radial surface. The portion of the inner radial surface of engine frame 204 is spaced from the outer radial surface of stator 212 by a predetermined spacing 224 to form an annular fluid passage 220 around stator 212. Annular fluid passage 220 is configured to direct a cooling fluid around stator 212 to remove heat from stator 212. Inlet fluid passage 216 is configured to receive a cooling fluid and outlet fluid passage 218 is configured to discharge the cooling fluid. Unless otherwise indicated, inlet fluid passage 216, outlet fluid passage 218, and annular fluid passage 220 may be structurally and/or functionally similar to inlet fluid passage 116, outlet fluid passage 118, and annular fluid passage 120 of FIGS. 1A-1G.

To create annular fluid passage 220, positioning keys 230 are configured to space stator 212 from engine frame 204. Positioning keys 230 may be configured to support a weight of stator 212 and resist torque between engine frame 204 and stator 212, such that stator 212 remains positioned within engine frame 204 having adequate clearance for flow of a cooling fluid, expansion of stator 212, or other use for which a cavity around stator 212 may be beneficial. The tightly controlled fit of positioning keys 230 may prevent relative radial movement of stator 212 and/or engine frame 204, to control the stator to rotor gap and ensure correct alignment of seals 138. Cooling of stator 212 may also help reduce relative thermal growth. In some examples, gas turbine engine 200 includes three or more positioning keys 230. Three or more positioning keys 230 may, in combination, provide resistance against movement in a radial direction.

In some examples, positioning keys 230 may be configured to provide an electrical ground between engine frame 204 and stator 212. For example, high frequency voltages in stator 212 or rotor 210 of electric machine 208 may create a capacitive voltage that generates currents in stator 212. These currents in stator 212 may be discharged through positioning keys 230 to engine frame 204. Positioning keys 230 may be fabricated from a material having a relatively low electrical resistivity, such as aluminum, copper, or other material having an electrical resistivity less than about $10^{-6}$ Ω·m.

Figure 2D:
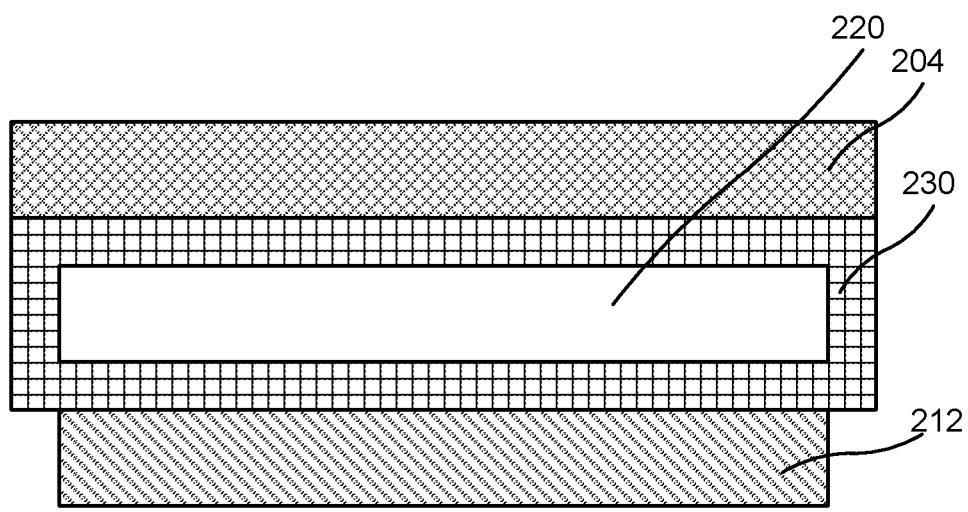
FIG. 2D is an expanded cross-section side view diagram illustrating an example portion of a gas turbine engine.

FIGS. 2C and 2D are exploded cross-section front view and expanded cross-section side view diagrams, respectively, illustrating an example portion of the gas turbine engine 200 of FIG. 2B. Engine frame 204 defines an outer radial surface 207 forming an outer boundary of engine frame 204 in a radial direction from axis 201 and an inner radial surface 205 forming an inner boundary of engine frame 204 in a radial direction from axis 201. Stator 212 defines an outer radial surface 213 forming an outer boundary of stator 212 in a radial direction from axis 201 that faces engine frame 204.

Positioning keys 230 may be configured to space a portion of inner radial surface 205 of engine frame 204 relative to outer radial surface 213 of stator 212, such that inner radial surface 205 and outer radial surface 213 form outer and inner boundaries, respectively, of an annular fluid passage or other gap around stator 212. Each of engine frame 204 and stator 212 includes one or more structures configured to interface with positioning keys 230. Engine frame 204 defines one or more outer slots 232 that each extend radially outward from inner radial surface 205. Each outer slot 232 is configured to receive a portion of a respective positioning key 230. Stator 212 defines one or more inner slots 234 that each extend radially inward from outer radial surface 213. Each positioning key 230 is configured to position within a corresponding outer slot 232 of engine frame 204 and a corresponding inner slot 234 of stator 212. While shown as having a substantially rectangular cross-sectional shape across axis 201, outer slots 232 and/or inner slots 234 may have any shape, such as a hemispherical shape, a triangular shape, or the like. Positioning keys 230 are configured to position within a corresponding outer slot 232 and a corresponding inner slot 234. As such, a shape of end portions of positioning keys 230 may correspond to a shape of outer slots 232 and inner slots 234.

Relative dimensions of positioning keys 230 with respect to outer slots 232 and inner slots 234 may define the spacing between engine frame 204 and stator 212. Engine frame 204 may define two or more outer slots 232, each having an outer slot depth 236 from inner radial surface 205 of engine frame 204. Stator 212 may define two or more inner slots 234, each having an inner slot depth 238 from outer radial surface 213 of stator 212. Each positioning key 230 has a key radial height 239. Key height 239 is greater than a sum of outer slot depth 236 and inner slot depth 238. The difference between key height 239 and depths 236 and 238 may represent a spacing of annular fluid passage 220, such as spacing 124 illustrated in FIG. 1D. In some examples, outer slot depth 236 and inner slot depth 238 may be between about 0.1 centimeters and 5 centimeters, such as about 0.75 centimeters. In some examples, key height 239 is greater than a combined outer slot depth 236 and inner slot depth 238 by between about 0.1 centimeters and about 2 centimeters, such as about 0.75 centimeters.

In some examples, the key width 237 can change to provide baulking to control the angular location or clocking of the stator with respect the stator frame. For example, one key may have larger width which would limit the orientation of the stator such that the larger stator slot width is aligned to the larger frame slot width by a wider positioning key. The clocking or baulking may also be achieved by a positioning key of greater radial height that could only fit in a deeper slot in the stator and frame.

Figure 2E:
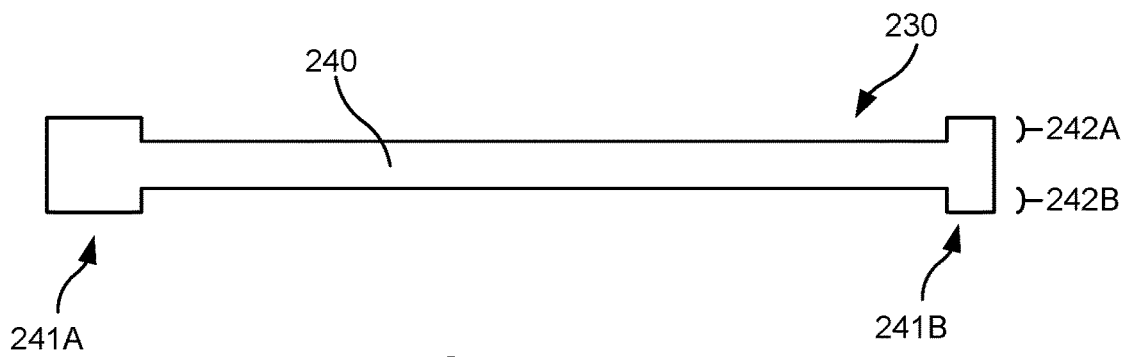
FIG. 2E is a top view diagram illustrating an example positioning key for a gas turbine engine.

In some examples, positioning keys described herein may be configured to assist in removal of stator 212. FIG. 2E is a top view diagram illustrating an example positioning key 230 for a gas turbine engine. Positioning key 230 includes a central body 240, a front end 241A, and a back end 241B. Body 240 is configured to interface with radial surfaces of engine frame 204 and stator 212 and permit cooling fluid to flow with an annular fluid passage between engine frame 204 and stator 212. In the example of FIG. 2E, each of front end 241A and back end 241B include projections 242A and 242B configured to interface with axial surfaces of stator 212. During installation and/or removal of stator 212, projections 242 may be used to push or pull on an axial end of stator 212, such that stator 212 may be moved within engine frame 204 with minimal risk of delaminating the stator due to axial tensile forces on the stator lamination stack.

Figure 2F:
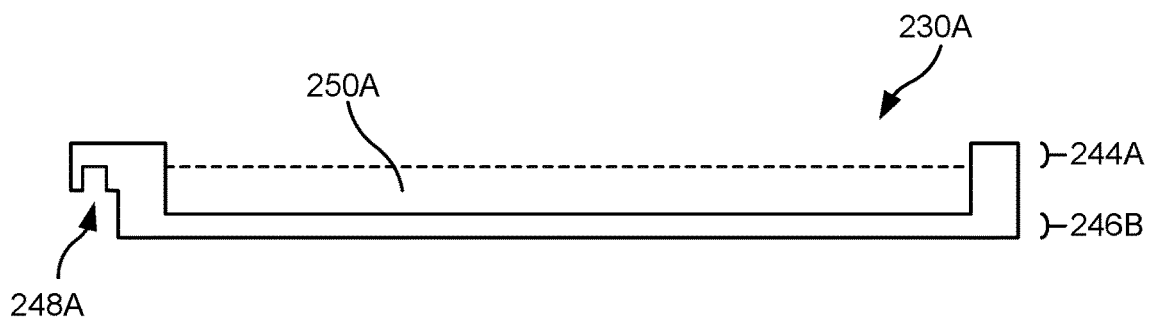
FIG. 2F is a side view diagram illustrating an example positioning key for a gas turbine engine.
Figure 2G:
FIG. 2G is a side view diagram illustrating an example positioning key for a gas turbine engine.
Figure 2H:
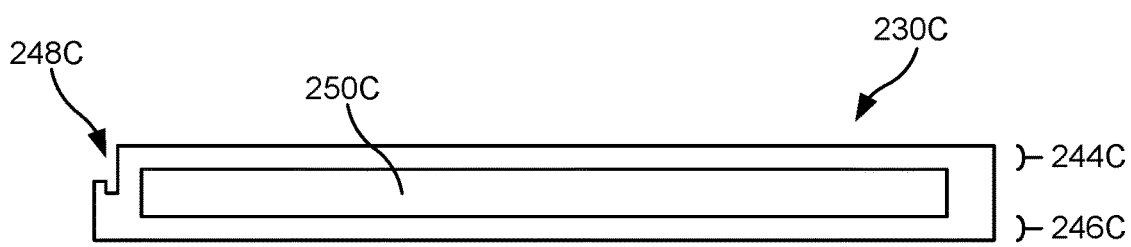
FIG. 2H is a side view diagram illustrating an example positioning key for a gas turbine engine.

FIGS. 2F-2H are side view diagrams illustrating example positioning keys 230A, 230B, 230C for a gas turbine engine. Each positioning key 230 includes a body 240 having an upper portion 244 and a lower portion 246. Upper portion 244 may be configured to fit within outer slot 232 of engine frame 204, while lower portion 246 may be configured to fit within inner slot 234 of stator 212. Each positioning key 230 includes a central cutout or window 250 configured to permit cooling fluid to flow between engine frame 204 and stator 212. In the examples of FIGS. 2F-2H, positioning keys 230 include a single cutout or window 250; however, in other examples, positioning key 230 may include multiple cutouts or windows 250, such as if positioning key 230 includes intermediate structures positioned in cutouts or windows to provide radial support between upper portion 244 and lower portion 246.

In some examples, positioning keys 230 may include one or more structures configured to assist in installation and/or removal of positioning key 230 into and/or out of gas turbine engine 200. Positioning keys 230 may be designed with features to grip the stack and avoid putting the stack in axial tension during stack installation and removal and thus avoid the risk of delamination of the stack. For example, positioning key 230 may include a slot configured to provide a hold or attachment point for withdrawing positioning key 230 from gas turbine engine 200. While shown as a single slot, positioning key 230 may include any number of structures having any shape.

In the example of FIG. 2F, positioning key 230A includes an overhang slot 248A configured to assist in installation or removal of positioning key 230A. Lower portion 246A extends across a length of positioning key 230A, while upper portion 244A does not extend across a length of positioning key 230A, thereby creating a cutout 250A. In the example of FIG. 2G, positioning key 230B includes an open slot 248B configured to assist in installation or removal of positioning key 230B. Like positioning key 230A of FIG. 2F, lower portion 246B extends across a length of positioning key 230B, while upper portion 244B does not extend across a length of positioning key 230B, thereby creating a cutout 250B. In the example of FIG. 2H, positioning key 230C includes an open slot 248C. However, both lower portion 246 and upper portion 244C extend across a length of positioning key 230C, thereby creating a window 250C.

Figure 3:
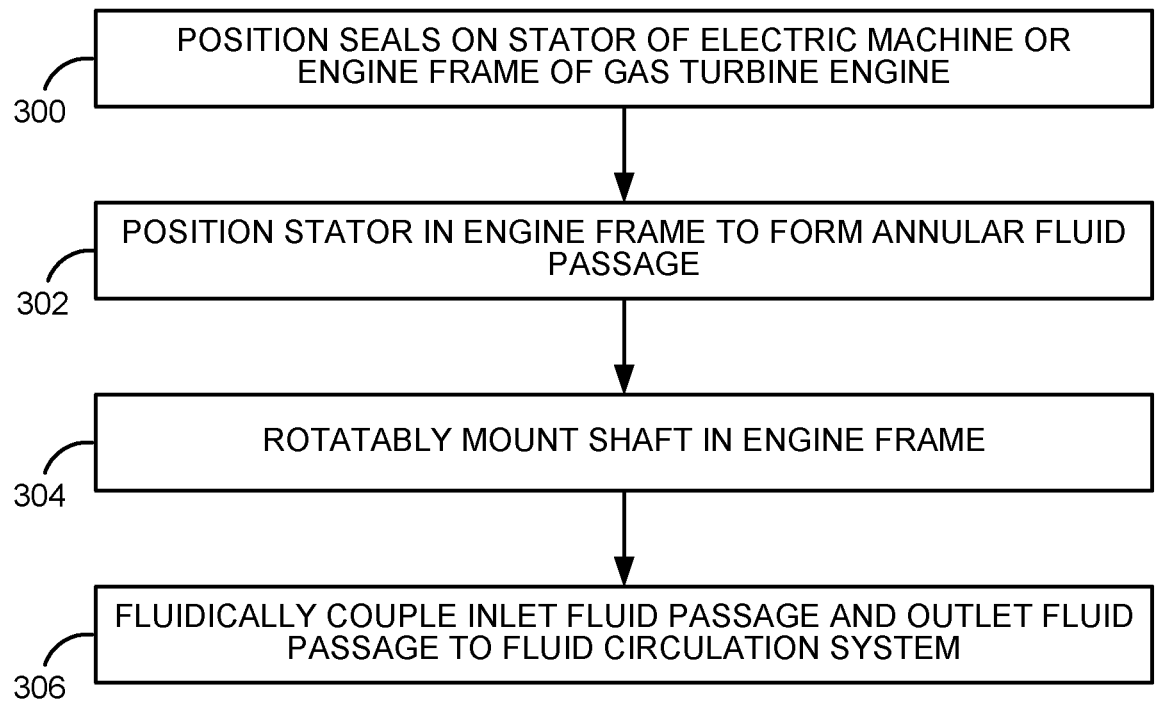
FIG. 3 is a flowchart of an example method for assembling an embedded electric machine of a gas turbine engine.

FIG. 3 is a flowchart of an example method for assembling an embedded electric machine of a gas turbine engine. The method of FIG. 3 will be described with reference to gas turbine engine 100 of FIGS. 1C and 1E. The method includes positioning stator 112 of electric machine 108 in engine frame 104 of gas turbine engine 100 (302), such as in a compressor section of gas turbine engine 100. As a result, a portion of an inner radial surface of engine frame 104 is spaced from an outer radial surface of stator 112 to form annular fluid passage 120 around stator 112, such that annular fluid passage 120 is configured to direct a cooling fluid around stator 112 to remove heat from stator 112. In some examples, engine frame 104 includes an annular slot 128 defining the portion of the inner radial surface 105 of engine frame 104 and extending around longitudinal axis 101. As such, positioning stator 112 of electric machine 108 in engine frame 104 of gas turbine engine 100 includes positioning a portion of the outer radial surface of stator 112 within annular slot 128 of engine frame 104.

The method may include, prior to positioning stator 112 of electric machine 108 in engine frame 104 of gas turbine engine 100, positioning one or more seals 138 on at least one of a radial surface 117 of engine frame 104 or outer axial radial 113 of stator 112 (300). As a result, positioning stator 112 of electric machine 108 in engine frame 104 of gas turbine engine 100 seals annular fluid passage 120. The method includes rotatably mounting shaft 106 in engine frame 104 along longitudinal axis 101 (304). For example, shaft 106 may be mounted on bearings or other mounting structures within engine frame 104, such that shaft 106 may rotate around axis 101 in response to a mechanical force on shaft 106. The method may include fluidically coupling inlet fluid passage 116 and outlet fluid passage 118 to a fluid circulation system (306). For example, one or more pipes may be secured to an inlet of inlet fluid passage 116 and outlet fluid passage 118.

Figure 4:
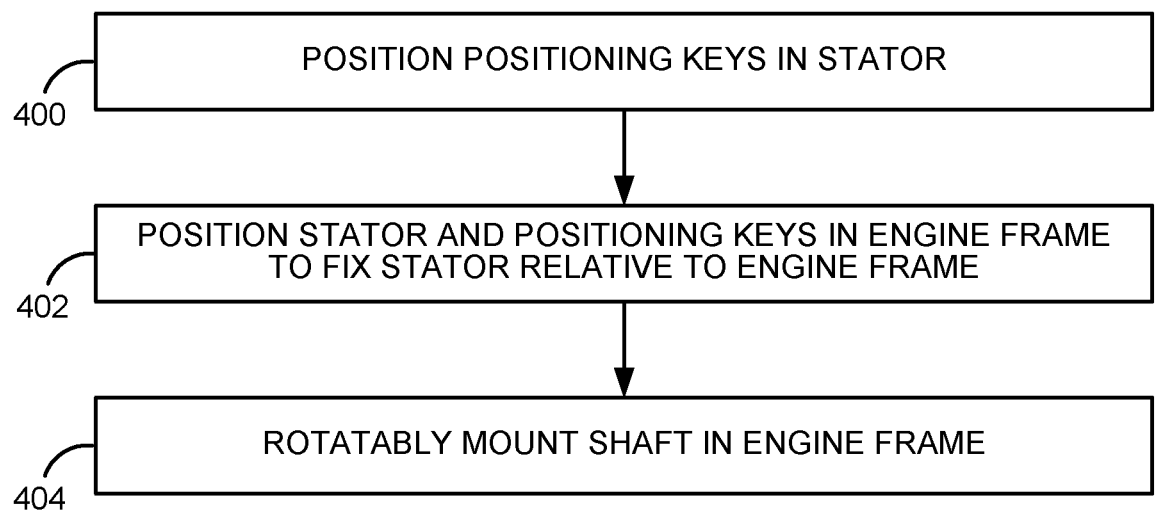
FIG. 4 is a flowchart of an example method for assembling an embedded electric machine of a gas turbine engine.

FIG. 4 is a flowchart of an example method for assembling an embedded electric machine of a gas turbine engine. The method of FIG. 4 will be described with reference to gas turbine engine 200 of FIGS. 2B and 2C. The method includes positioning two or more positioning keys in stator 212 of electric machine 208 (400). Stator 212 may define one or more inner slots 234, such that positioning two or more positioning keys 230 in stator 212 includes positioning each of the two or more positioning keys 230 within a corresponding inner slot 234 of stator 212.

The method includes positioning stator 212, including the two or more positioning keys 230, in engine frame 204 of gas turbine engine 200 (402), such as upstream of a compressor section of gas turbine engine 200. Engine frame 204 may define one or more outer slots 232, such that positioning stator 212 in engine frame 204 includes positioning each of the two or more positioning keys 230 within a corresponding outer slot 232 of engine frame 204. Once positioned, the two or more positioning keys 230 substantially fix stator 212 relative to engine frame 204. In some examples, in which engine frame 204 includes an annular slot defining the portion of the inner radial surface of engine frame 204 and extending around the longitudinal axis, positioning stator 212 of electric machine 208 in engine frame 204 of gas turbine engine 200 includes positioning a portion of the outer radial surface of stator 212 within the annular slot of engine frame 204.

In some examples, such as illustrated in FIG. 2B, positioning the two or more positioning keys 230 may position stator 212 in a radial direction relative to engine frame 204, such that a portion of an inner radial surface of engine frame 204 is spaced from an outer radial surface of stator 212 to form annular fluid passage 220 around stator 212. For example, positioning keys 230 may be selected that have key heights 239 that are greater than a combined depth of outer slot depths 236 and inner slot depths 238, such that a cavity exists around stator 212. The method includes rotatably mounting shaft 206 in engine frame 204 (404), such as described in step 304 of FIG. 3.

Example 1: A gas turbine engine includes an engine frame defining an inner radial surface, wherein the engine frame comprises an inlet fluid passage and an outlet fluid passage, each extending to a portion of the inner radial surface; a shaft rotatably mounted inside the engine frame along a longitudinal axis; and an electric machine includes a rotor coupled to the shaft; and a stator coupled to the engine frame and defining an outer radial surface, wherein the portion of the inner radial surface of the engine frame is spaced from the outer radial surface of the stator to form an annular fluid passage around the stator, wherein the inlet fluid passage, the outlet fluid passage, and the annular fluid passage are interconnected to form a continuous fluid passage, and wherein the annular fluid passage is configured to direct a cooling fluid around the stator to remove heat from the stator.

Example 2: The gas turbine engine of example 1, wherein the gas turbine engine is a turbofan engine comprising an exterior casing coupled to the engine frame across a gas flow path through one or more vanes, and wherein the inlet fluid passage and the outlet fluid passage extend from the engine frame to the casing through at least one vane of the one or more vanes to promote heat transfer to air in the gas flow path.

Example 3: The gas turbine engine of any of examples 1 and 2, wherein the inlet fluid passage is configured to receive a pressurized cooling fluid, and wherein the outlet fluid passage is configured to discharge the pressurized cooling fluid.

Example 4: The gas turbine engine of any of examples 1 through 3, wherein a spacing between the inner radial surface of the engine frame and the outer radial surface of the stator is less than about 2 centimeters.

Example 5: The gas turbine engine of any of examples 1 through 4, wherein the engine frame defines outer radial surface and wherein at least a portion of the outer radial surface of the engine frame is configured to contact a gas flow path of the gas turbine engine.

Example 6: The gas turbine engine of any of examples 1 through 5, further comprising one or more seals between the engine frame and the stator to seal the annular fluid passage.

Example 7: The gas turbine engine of any of examples 1 through 6, wherein the stator comprises one or more end windings, and wherein the gas turbine engine further comprises one or more spray jets configured to spray a cooling fluid on at least a portion of the one or more end windings.

Example 8: The gas turbine engine of example 7, wherein the one or more spray jets are fluidically coupled to at least one of the inlet fluid passage, the outlet fluid passage, or the annular fluid passage.

Example 9: The gas turbine engine of any of examples 1 through 8, wherein the inner radial surface of the engine frame or a plurality of fins in the inner radial surface of the engine frame includes one or more axial, circumferential, or spiral cooling passages, or combinations thereof, around the stator configured to improve cooling of the stator.

Example 10: The gas turbine engine of any of examples 1 through 9, wherein the outer radial surface of the stator or a plurality of fins in the outer radial surface of the stator includes one or more axial, circumferential, or spiral cooling flow passages, or a combination thereof, around the stator configured to improve cooling of the stator.

Example 11: The gas turbine engine of any of examples 1 through 10, wherein the outer radial surface of the stator comprises a plurality of fins configured to increase a surface area of the outer radial surface and form a plurality of cooling passages aligned circumferentially around the outer radial surface of the engine frame.

Example 12: The gas turbine engine of any of examples 1 through 11, wherein the cooling fluid comprises a pressurized cooling oil configured to lubricate the gas turbine engine.

Example 13: The gas turbine engine of any of examples 1 through 12, wherein there is the more than one inlet or outlet cooling passage to and from the annular fluid passage.

Example 14: The gas turbine engine of any of examples 1 through 13, wherein the inlet fluid passage and the outlet fluid passage each have an extended length to increase a total surface area and promote heat transfer to the engine frame as a heat exchanger.

Example 15: The gas turbine engine of any of examples 1 through 14, further comprising a controller configured to control a flow rate of the cooling fluid based on one or more parameters of the electric machine indicating a power or a temperature of the electric machine.

Example 16: A method of assembling an electric machine of a gas turbine engine includes coupling a stator of the electric machine to an engine frame of the gas turbine engine, wherein the engine frame comprises an inlet fluid passage and an outlet fluid passage, each extending to a portion of an inner radial surface of the engine frame, wherein the portion of the inner radial surface of the engine frame is spaced from an outer radial surface of the stator to form an annular fluid passage around the stator, wherein the inlet fluid passage, the outlet fluid passage, and the annular fluid passage are interconnected to form a continuous fluid passage, and wherein the annular fluid passage is configured to direct a cooling fluid around the stator to remove heat from the stator; and rotatably mounting a shaft in the engine frame along a longitudinal axis, wherein the electric machine includes a rotor coupled to the shaft.

Example 17: The method of example 16, wherein a spacing between the inner radial surface of the engine frame and the outer radial surface of the stator is less than about two centimeters.

Example 18: The method of any of examples 16 and 17, further comprising, prior to coupling the stator of the electric machine to the engine frame of the gas turbine engine, positioning one or more seals on at least one of the inner radial surface of the engine frame or the outer radial surface of the stator, wherein coupling the stator of the electric machine to the engine frame of the gas turbine engine seals the annular fluid passage.

Example 19: A method for cooling an electric machine of a gas turbine engine includes delivering a cooling fluid to an annular fluid passage around a stator of the electric machine to remove heat from the stator, wherein the gas turbine engine comprises: an engine frame defining an inner radial surface, wherein the engine frame comprises an inlet fluid passage and an outlet fluid passage, each extending to a portion of the inner radial surface; a shaft rotatably mounted inside the engine frame along a longitudinal axis; and the electric machine includes a rotor coupled to the shaft; and the stator coupled to the engine frame and defining an outer radial surface, wherein the portion of the inner radial surface of the engine frame is spaced from the outer radial surface of the stator to form the annular fluid passage around the stator, wherein the inlet fluid passage, the outlet fluid passage, and the annular fluid passage are interconnected to form a continuous fluid passage.

Example 20: The method of example 19, wherein a flow rate of the cooling fluid is controlled based one or more parameters of the electric machine indicating a power or a temperature of the electric machine.

Example 21: A gas turbine engine includes an engine frame defining an inner radial surface; a shaft rotatably mounted inside the engine frame along a longitudinal axis; an electric machine includes a rotor coupled to the shaft; and a stator coupled to the engine frame; and two or more positioning keys configured to substantially fix the stator relative to the engine frame.

Example 22: The gas turbine engine of example 21, wherein the two or more positioning keys are configured to resist a torque between the stator and the engine frame in a direction tangential to the longitudinal axis.

Example 23: The gas turbine engine of any of examples 21 and 22, wherein the two or more positioning keys are configured to position the stator in a radial direction relative to the longitudinal axis.

Example 24: The gas turbine engine of any of examples 21 through 23, wherein the engine frame defines one or more outer slots, wherein the stator defines one or more inner slots, and wherein the two or more positioning keys are configured to position within a corresponding outer slot and a corresponding inner slot.

Example 25: The gas turbine engine of any of examples 21 through 24, wherein at least one of the two or more positioning keys is configured to aid in installing and removing the stator.

Example 26: The gas turbine engine of any of examples 21 through 25, wherein at least two of the two or more positioning keys are configured with different sizes or features to control a tangential position or clocking between of the stator in the engine frame.

Example 27: The gas turbine engine of any of examples 21 through 26, wherein the engine frame comprises an inlet fluid passage and an outlet fluid passage, each extending to a portion of the inner radial surface of the engine frame, wherein the portion of the inner radial surface of the engine frame is spaced from an outer radial surface of the stator to form an annular fluid passage around the stator, and wherein the annular fluid passage is configured to direct a cooling fluid around the stator to remove heat from the stator.

Example 28: The gas turbine engine of example 27, wherein each of the two or more positioning keys includes a cutout configured to permit flow of the cooling fluid through the respective positioning key.

Example 29: The gas turbine engine of any of examples 27 and 28, wherein each of the two or more positioning keys includes a window configured to permit flow of the cooling fluid through the respective positioning key.

Example 30: The gas turbine engine of any of examples 27 through 29, wherein the two or more positioning keys are configured to space the inner radial surface of the engine frame relative to the outer radial surface of the stator.

Example 31: The gas turbine engine of example 30, wherein the engine frame defines two or more outer slots, each having an outer slot depth, wherein the stator defines two or more inner slots, each having an inner slot depth, and wherein the two or more positioning keys are configured to position within a corresponding outer slot and a corresponding inner slot, each positioning key having a radial height that is greater than a sum of the outer slot depth and the inner slot depth.

Example 32: The gas turbine engine of any of examples 21 through 31, wherein at least one of the two or more positioning keys is configured to provide an electrical ground between the stator and the engine frame.

Example 33: The gas turbine engine of any of examples 21 through 32, wherein the two or more positioning keys incorporate features configured to be gripped to push or pull on the keys during installation or removal the stator from the engine frame.

Example 34: The gas turbine engine of any of examples 21 through 33, wherein two or more positioning keys include tangential or radial features configured to pull or push on a lamination stack of the stator to avoid delamination of the stator in response to stack tensile axial loads exerted when the two or more positioning keys are used to install or remove the lamination stack from the engine frame.

Example 35: A method of assembling an electric machine of a gas turbine engine includes positioning two or more positioning keys in a stator of the electric machine; positioning the stator and the two or more positioning keys in an engine frame of the gas turbine engine, wherein, once positioned, the two or more positioning keys substantially fix the stator relative to the engine frame; and rotatably mounting a shaft in the engine frame along a longitudinal axis, wherein the electric machine includes a rotor coupled to the shaft.

Example 36: The method of example 35, wherein the two or more positioning keys are configured to resist a torque between the stator and the engine frame in a direction tangential to the longitudinal axis.

Example 37: The method of any of examples 35 and 36, wherein the two or more positioning keys are configured to position the stator relative to the engine frame in a radial direction relative to the longitudinal axis.

Example 38: The method of any of examples 35 through 37, wherein the engine frame defines one or more outer slots, wherein the stator defines one or more inner slots, and wherein positioning the two or more positioning keys in the stator and engine frame comprises positioning each of the two or more positioning keys within a corresponding outer slot and a corresponding inner slot.

Example 39: The method of any of examples 35 through 38, wherein the engine frame comprises an inlet fluid passage and an outlet fluid passage, each extending to a portion of an inner radial surface of the engine frame, and wherein the portion of the inner radial surface of the engine frame is spaced from an outer radial surface of the stator to form an annular fluid passage around the stator.

Example 40: The method of example 39, wherein the engine frame comprises an annular slot defining the portion of the inner radial surface of the engine frame and extending around the longitudinal axis, and wherein positioning the stator of the electric machine in the engine frame of the gas turbine engine comprises positioning a portion of the outer radial surface of the stator within the annular slot of the engine frame.

Various examples have been described. These and other examples are within the scope of the following claims.

What is claimed is:

1. A gas turbine engine, comprising:
    an engine frame defining an inner radial surface;
    a shaft rotatably mounted inside the engine frame along a longitudinal axis;
    an electric machine comprising:
        a rotor coupled to the shaft; and
        a stator coupled to the engine frame; and
    two or more positioning keys configured to substantially fix the stator relative to the engine frame,
    wherein the engine frame comprises an inlet fluid passage and an outlet fluid passage, each extending to a portion of the inner radial surface of the engine frame,
    wherein the portion of the inner radial surface of the engine frame is spaced from an outer radial surface of the stator to form an annular fluid passage around the stator,
    wherein the annular fluid passage is configured to direct a cooling fluid around the stator to remove heat from the stator, and
    wherein each of the two or more positioning keys includes at least one of a cutout or a window configured to permit flow of the cooling fluid through the respective positioning key.

2. The gas turbine engine of claim 1, wherein the two or more positioning keys are configured to resist a torque between the stator and the engine frame in a direction circumferential tangential to the longitudinal axis.

3. The gas turbine engine of claim 1, wherein the two or more positioning keys are configured to position the stator in a radial direction relative to the longitudinal axis.

4. The gas turbine engine of claim 1,
    wherein the engine frame defines one or more outer slots,
    wherein the stator defines one or more inner slots, and
    wherein the two or more positioning keys are configured to position within a corresponding outer slot and a corresponding inner slot.

5. The gas turbine engine of claim 1, wherein at least one of the two or more positioning keys is configured to aid in installing and removing the stator.

6. The gas turbine engine of claim 1, wherein at least two of the two or more positioning keys are configured with different sizes or features to control a circumferential position or clocking between the stator in the engine frame.

7. The gas turbine engine of claim 1, wherein each of the two or more positioning keys includes a cutout configured to permit flow of the cooling fluid through the respective positioning key.

8. The gas turbine engine of claim 1, wherein each of the two or more positioning keys includes a window configured to permit flow of the cooling fluid through the respective positioning key.

9. The gas turbine engine of claim 1, wherein the two or more positioning keys are configured to space the inner radial surface of the engine frame relative to the outer radial surface of the stator.

10. The gas turbine engine of claim 9,
wherein the engine frame defines two or more outer slots, each having an outer slot depth,
wherein the stator defines two or more inner slots, each having an inner slot depth, and
wherein the two or more positioning keys are configured to position within a corresponding outer slot and a corresponding inner slot, each positioning key having a radial height that is greater than a sum of the outer slot depth and the inner slot depth.

11. The gas turbine engine of claim 1, wherein at least one of the two or more positioning keys is configured to provide an electrical ground between the stator and the engine frame.

12. The gas turbine engine of claim 1, wherein the two or more positioning keys incorporate features configured to be gripped to push or pull on the keys during installation or removal of the stator from the engine frame.

13. The gas turbine engine of claim 1, wherein two or more positioning keys include tangential or radial features configured to pull or push on a lamination stack of the stator to avoid delamination of the stator in response to stack tensile axial loads exerted when the two or more positioning keys are used to install or remove the lamination stack from the engine frame.

14. A method of assembling an electric machine of a gas turbine engine, comprising:
    positioning two or more positioning keys in a stator of the electric machine;
    positioning the stator and the two or more positioning keys in an engine frame of the gas turbine engine, wherein, once positioned, the two or more positioning keys substantially fix the stator relative to the engine frame; and
    rotatably mounting a shaft in the engine frame along a longitudinal axis, wherein the electric machine includes a rotor coupled to the shaft,
    wherein the engine frame comprises an inlet fluid passage and an outlet fluid passage, each extending to a portion of an inner radial surface of the engine frame,
    wherein the portion of the inner radial surface of the engine frame is spaced from an outer radial surface of the stator to form an annular fluid passage around the stator,
    wherein the annular fluid passage is configured to direct a cooling fluid around the stator to remove heat from the stator, and
    wherein each of the two or more positioning keys includes at least one of a cutout or a window configured to permit flow of the cooling fluid through the respective positioning key.

15. The method of claim 14, wherein the two or more positioning keys are configured to resist a torque between the stator and the engine frame in a direction circumferential to the longitudinal axis.

16. The method of claim 14, wherein the two or more positioning keys are configured to position the stator relative to the engine frame in a radial direction relative to the longitudinal axis.

17. The method of claim 14,
wherein the engine frame defines one or more outer slots,
wherein the stator defines one or more inner slots, and
wherein positioning the two or more positioning keys in the stator and engine frame comprises positioning each of the two or more positioning keys within a corresponding outer slot and a corresponding inner slot.

18. The method of claim 14,
wherein the engine frame comprises an annular slot defining the portion of the inner radial surface of the engine frame and extending around the longitudinal axis, and
wherein positioning the stator of the electric machine in the engine frame of the gas turbine engine comprises positioning a portion of the outer radial surface of the stator within the annular slot of the engine frame.

19. A gas turbine engine, comprising:
    an engine frame defining an inner radial surface;
    a shaft rotatably mounted inside the engine frame along a longitudinal axis;
    an electric machine comprising:
        a rotor coupled to the shaft; and
        a stator coupled to the engine frame; and
    two or more positioning keys configured to substantially fix the stator relative to the engine frame,
    wherein the two or more positioning keys include tangential or radial features configured to pull or push on a lamination stack of the stator to avoid delamination of the stator in response to stack tensile axial loads exerted when the two or more positioning keys are used to install or remove the lamination stack from the engine frame.

* * * * *